(No Model.)

A. B. HENDRYX.
FISHING REEL.

No. 473,700. Patented Apr. 26, 1892.

UNITED STATES PATENT OFFICE.

ANDREW B. HENDRYX, OF NEW HAVEN, CONNECTICUT.

FISHING-REEL.

SPECIFICATION forming part of Letters Patent No. 473,700, dated April 26, 1892.

Application filed March 14, 1892. Serial No. 424,796. (No model.)

*To all whom it may concern:*

Be it known that I, ANDREW B. HENDRYX, of New Haven, in the county of New Haven and State of Connecticut, have invented a new Improvement in Fishing-Reels, (Case C;) and I do hereby declare the following, when taken in connection with accompanying drawings and the letters of reference marked thereon, to be a full, clear, and exact description of the same, and which said drawings constitute part of this specification, and represent, in—

Figure 1:
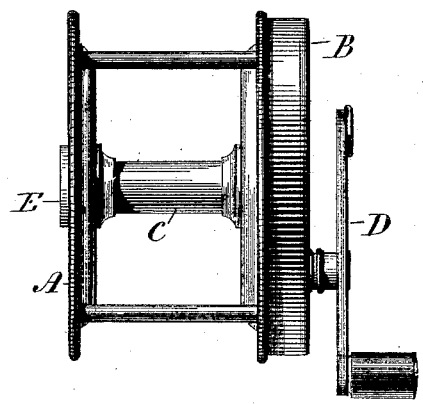
Figure 2:
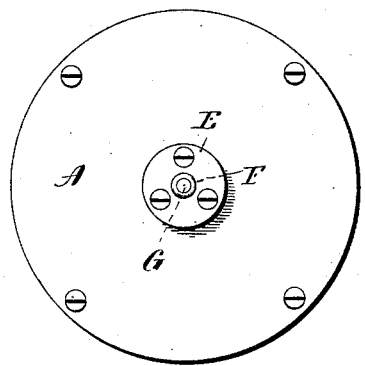
Figure 3:
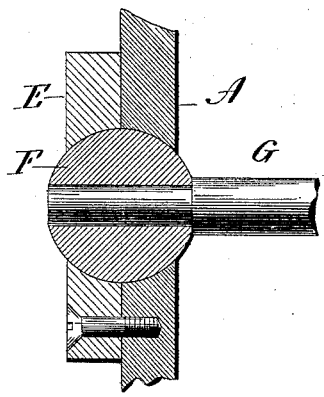

Figure 1, a side view of the reel complete; Fig. 2, an end view of the same, and Fig. 3 a vertical section of one of the heads with its cap and bearing-piece enlarged.

This invention relates to an improvement in that class of fishing-reels in which the frame is composed of a pair of heads connected by rods or pillars and between which heads the spool is hung, the arbor of the spool taking a bearing in each of the heads. In the construction of this class of reels it is necessary that the bearings for the shaft be formed before the heads are set together. In uniting the two heads by means of rods or pillars, which connect them, it is extremely difficult to bring the two holes formed for the bearings of the spool-arbor into such direct line as to give perfect freedom to the revolution of the shaft, and it is also extremely difficult to ream the holes after the two heads are secured together so as to bring them into perfect alignment to remain so, for the reason that after the holes are so reamed it is necessary to separate the two heads for the introduction of the spool and its arbor, and in replacing the same after such separation they are liable to be thrown out of alignment and cause the arbor to bind to a greater or less extent.

The object of my invention is to provide a bearing in the heads for the arbor of the reel which will adjust itself into alignment with the arbor and so as to permit perfect freedom of revolution to the arbor and spool; and the invention consists in the construction of the bearings, as hereinafter described, and particularly recited in the claim.

In general appearance the reel does not differ from the common construction of reels.

A represents one head, and B the other head, within which the multiplying gearing is introduced; C, the spool, and D the crank by which revolution is imparted to the spool, all of substantially the usual construction. At the center of each of the heads a cap E is applied, and through the cap and head a hole for the bearing is formed of hollow spherical shape, substantially one half of the hole in the head and the other half of the hole in the cap E, and as clearly seen in Fig. 3.

F represents the bearing-piece, which is of spherical shape, its external diameter and shape corresponding to the internal diameter and shape of the hole or bearing-seat formed in the head and cap and so that the bearing-piece set into its seat in the head and the cap E placed thereon and secured the bearing-piece is held in place simply by frictional contact between it and the seat. Diametrically through the bearing a hole is made corresponding to the gudgeon G on the arbor and so that the arbor may revolve freely in the bearing F. The two heads of the reel are fitted with these spherical bearing-pieces and in assembling the parts the gudgeons or bearing parts of the arbor are introduced into these bearing-pieces, and these bearing-pieces readily adjust themselves to the axial line of the bearing, and this adjustment is always attained whenever the arbor is set in place and irrespective of what may be the relative position of the two bearing-pieces before the arbor is introduced. They therefore become self-adjusting bearings. The friction between the head-piece, cap, and the bearing-piece is sufficient to prevent the rotation of the bearing-piece with the arbor, so that the arbor is as free to revolve in the bearing-piece as if the bearing-piece were made a stationary part of the head. The arrangement permits the oscillation of the shaft to a very considerable extent, as indicated by broken lines, which is more than sufficient for all the variations which may occur in the setting of the parts together.

It will be evident that the cap may be applied either to the outside or the inside of the heads. The result so far as the bearing-piece is concerned is the same, it only being essential that the parts composing the bearing-seat between the two plates shall divide in a plane at substantially right angles to the axis of the arbor.

I claim—

The herein-described improvement in fishing-reels, consisting in a bearing-piece for the arbor of substantially spherical shape, having a hole diametrically through it to receive the arbor, the head of the reel constructed with a recess corresponding, substantially, to one half the said bearing-piece, combined with a cap having a recess corresponding, substantially, to the other half of said bearing-piece and so that the cap and head together form a seat for the bearing-piece, substantially as described.

In testimony whereof I have signed this specification in the presence of two subscribing witnesses.

ANDREW B. HENDRYX.

Witnesses:
EDWARD N. PECK,
B. J. STONE.